United States Patent Office 3,096,378
Patented July 2, 1963

3,096,378
CHLORINATION OF NITROETHANE
Dewey Robert Levering, Wilmington, Del., assignor, by mesne assignments, to the United States of America as represented by the Secretary of the Navy
No Drawing. Filed Oct. 10, 1962, Ser. No. 229,768
3 Claims. (Cl. 260—644)

This invention relates to the preparation of 1-chloro-1-nitroethane and in particular to a commercially feasible method for production of mono-chloronitroethane of high quality by the mono-chlorination of nitroethane.

It is well known that nitroethane can be chlorinated in a coil continuous reactor or in a stirred batch reactor. It is also known that, in the chlorination of nitroethane, two side reactions occur thereby markedly cutting the yield of the desired product. One side reaction results in the formation of dichloronitroethane and the other reaction is hydrolysis of the mono-chloronitroethane to acetaldehyde and acetic acid. The products of these side reactions not only contaminate the mono-chloronitroethane product but also reduce the yield of product desired from the reactants. The yield of product based on nitroethane required is further lowered by the fact that considerable mono-chloronitroethane must usually be discarded in separating and disposing of the dichloronitroethane, acetaldehyde and acetic acid.

It is an object of this invention to prepare mono-chloronitroethane in high yield and purity by the monochlorination of nitroethane.

It is further an object to carry out the mono-chlorination of nitroethane with minimal production of dichloronitroethane impurity and with minimal addition of foreign materials.

Other objects and many of the attendant advantages of this invention will be readily appreciated as the same becomes better understood by reference to the following detailed description.

It has now been found that nitroethane can be chlorinated to mono-chloronitroethane with minimal concurrent formation of dichloronitroethane, with no loss in yield through discard of residues containing concentrated impurities, and with no complex expensive distillation for product recovery. The invention consists of a rather rigidly controlled chlorination of nitroethane with a special emphasis being placed on the control of the reaction variables such as agitation, temperature and time of reaction.

An aqueous solution of the sodium salt of nitroethane is prepared by adding a solution of sodium hydroxide to a slurry of nitroethane in water with cooling and stirring.

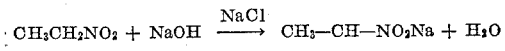

After all of the nitroethane is in solution, sodium chloride is added to decrease the solubility of the product (chloronitroethane) in the aqueous solution. The sodium salt of nitroethane is then placed in a jacketed columnar reactor. The solution is then cooled by circulating a cooling liquid through the jacket. After the solution has been cooled to 0° C., chlorine was bubbled through the nitroethane solution and the product mono-chloronitroethane was removed as it was formed. The inventor discovered that by bubbling the chlorine through the nitroethane solution the mono-chloronitroethane product would separate as a layer at the bottom of the reactor so that it was separate and apart from the aqueous layer. With stirring this layer either did not form or was much smaller.

The effect of temperature on the production of mono-chloronitroethane is very significant. When the reaction was started at room temperature and the temperature allowed to rise without cooling little (0–13% conversion) 1-chloro-1-nitroethane was obtained. Some dichloro compound (10–14% conversion) was obtained and most of the rest of the starting material was not recovered. However, when the temperature was maintained within the range of 0° C.±5° C., there resulted at least a 90% conversion of the nitroethane to mono-chlornitroethane. At this temperature very little dichloro compound was formed. At lower temperature the desired reaction proceeds but at a slower rate. The minimum temperature which can be used is controlled by the freezing point of the solution. Temperatures higher than 5° C. are acceptable if the other conditions are rigidly controlled. However, as the temperature is increased the yield of desired product drops markedly and the process is not practical above 25° C. In summary, a temperature range of —20° C. to +25° C. would be feasible for the reactor to take place; however, the preferred range is —5° C. to +5° C.

Another variable which markedly affects the reaction is the basicity of the solution. With 100% excess base no mono-chloronitroethane was recovered. Any excess base is detrimental since the product will dissolve in base and this is the form that most readily undergoes the various side reactions according to the following equations:

$$CH_3CHNO_2Na + CH_3CHNO_2 \longrightarrow CH_3CH_2NO_2 + CH_3CNO_2Na$$
$$\quad\quad\quad\quad\quad\quad\quad\quad |\quad\quad\quad\quad\quad\quad\quad\quad\quad\quad\quad\quad\quad\quad\quad |$$
$$\quad\quad\quad\quad\quad\quad\quad\quad Cl\quad\quad\quad\quad\quad\quad\quad\quad\quad\quad\quad\quad\quad\quad\quad Cl$$

The sodium salt of chloronitroethane can then be converted to the dichloro compound or hydrolyzed to water-soluble compounds such as acetaldehyde.

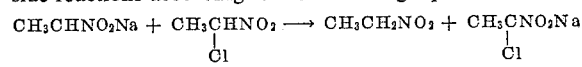

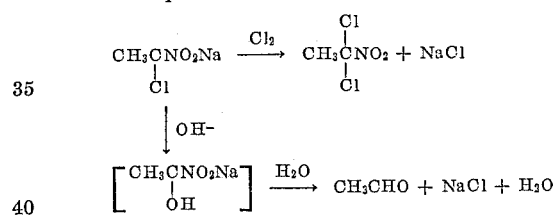

An improvement in conversion of the nitroethane to mono-chloronitroethane and a decrease in the amount of dichloronitroethane was observed when sodium chloride was added to the starting solution.

It should be noted that chlorine is continuously bubbled through the nitroethane solution until the aqueous layer becomes acidic. The reaction appears to be instantaneous and controlled by the rate of chlorine addition. Due to the large heat of reaction, the chlorine addition depends upon the efficiency of the system in dissipating this heat as the temperature is maintained around 0° C. The length of time the product is in contact with the reaction mixture will have a marked effect on the yield. A reasonable reaction time is one hour.

The following example will illustrate a commercial application of the process to the production of mono-chloronitroethane.

A solution prepared by dissolving 1800 g. of 94.7% nitroethane (22.7 moles) in 6.8 liters of water containing 900 g. of sodium hydroxide (22.5 moles) and 700 g. of sodium chloride was placed in a 8-ft. jacketed columnar reactor. The solution was cooled to 0° C. and chlorine bubbled through the solution for 1.3 hours while maintaining the temperature at 0° C.±5. The chloronitroethane separated as small droplets which settled to the bottom of the reactor and were removed as enough was collected. This process produced 2440 g. of 1-chloro-1-nitroethane for a 97.8% conversion of nitroethane to the monochloro product.

Besides giving very high conversion of mono-chlorinated product, this process has the further advantage of producing very little of the dichloronitroethane which has almost the same boiling point as mono-chloronitroethane and cannot be readily separated from it.

I claim:

1. In a process for the production of 1-chloro-1-nitroethane which comprises bubbling chlorine through a solution of sodium nitroethane; incorporating sodium chloride therewith; maintaining the temperature in a range from −20° C. to +25° C.; immediately removing the 1-chloro-1-nitroethane as formed from the said solution with little or no agitation whereby production of dichloronitroethane is suppressed.

2. In a process for the production of 1-chloro-1-nitroethane which comprises slowly passing chlorine through a solution of sodium nitroethane dissolved in sodium hydroxide and having sodium chloride incorporated therewith to decrease the solubility of 1-chloro-1-nitroethane in the aqueous solution; maintaining the temperature of the reactions between −4° C. and +5° C.; and immediately removing the 1-chloro-1-nitroethane as formed from the said solution with little or no agitation whereby production of dichloronitroethane is suppressed.

3. In a process for the production of 1-chloro-1-nitroethane which comprises forming a solution consisting essentially of 1800 grams of 94.7% nitroethane dissolved in 6.8 liters of water containing 900 grams of sodium hydroxide; placing 700 grams of sodium chloride in a 8-ft. jacketed columnar reactor; cooling the solution to 0° C.; bubbling chlorine through the solution for 1.3 hours; maintaining the temperature at 0° C.±5° C. and immediately removing the 1-chloro-1-nitroethane as formed from the said solution with little or no agitation whereby production of dichloronitroethane is suppressed.

No references cited.